June 3, 1969  P. COIFFU  3,447,791
METHOD AND ARRANGEMENT FOR PRODUCING WHITE CEMENT
Filed Dec. 7, 1965
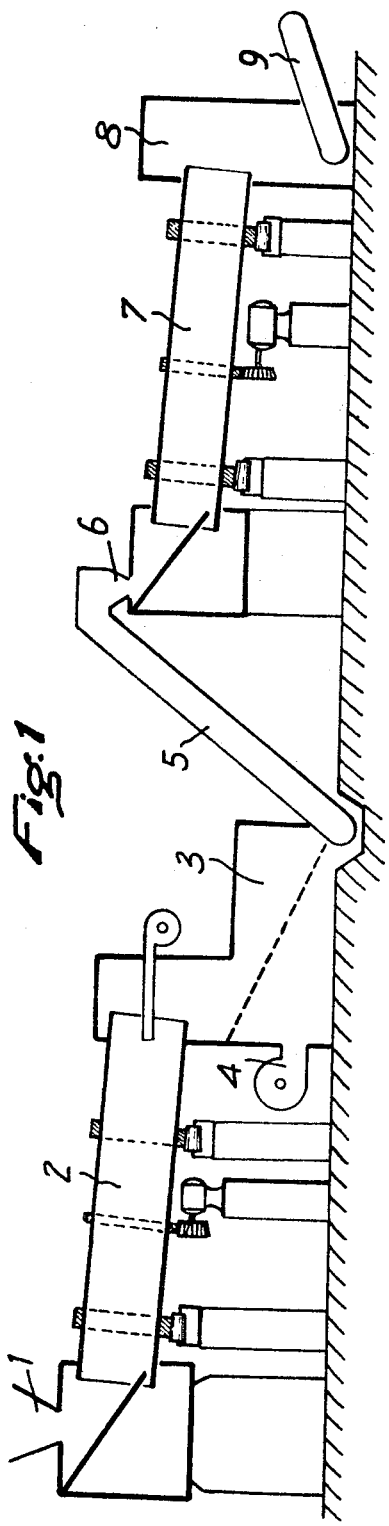
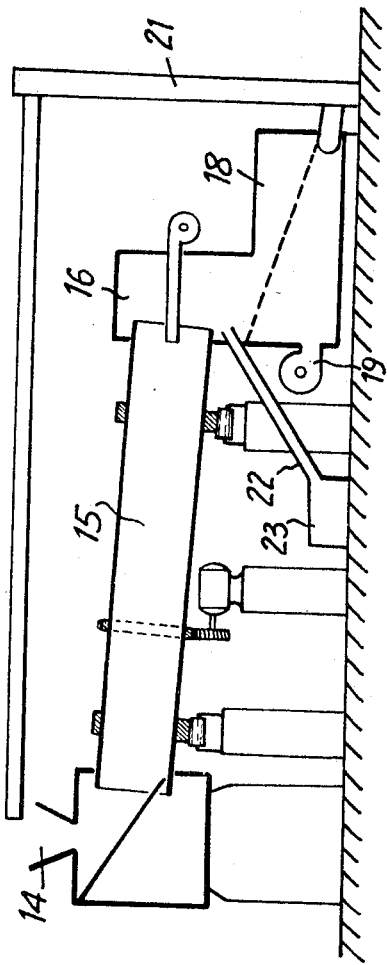
Inventor
Pierre Coiffu
by Michael J. Striker
Atty United States Patent Office
3,447,791
Patented June 3, 1969

3,447,791
METHOD AND ARRANGEMENT FOR PRODUCING WHITE CEMENT
Pierre Coiffu, Paris, France, assignor to Societe des Ciments Francais, Guerville, France
Filed Dec. 7, 1965, Ser. No. 512,129
Claims priority, application France, Dec. 8, 1964, 997,791
Int. Cl. F27b 7/00; C04b 7/44
U.S. Cl. 263—32
9 Claims

ABSTRACT OF THE DISCLOSURE

White hydraulic cement is produced by calcining in a kiln in the presence of hot combustion air a material capable of forming upon calcination clinkers which when cooled in a non-oxidizing medium will be substantially white, thereby forming hot clinkers of the material. The thus-formed hot clinkers are then subjected to direct heat exchange with air and cooled thereby while the air is simultaneously heated and colored clinkers are obtained upon cooling of the hot clinkers. The thus-heated air is introduced into the kiln as hot combustion air and the thus-obtained colored, cooled clinkers are reheated to a temperature of at least between about 800 and 1,200° C. so that, due to such reheating, the coloration of the clinkers will disappear. The thus reheated clinkers are then cooled in a non-oxidizing medium. This will result in cool substantially white clinkers capable of being converted into white cement.

The above-described method may be advantageously carried out in an arrangement which includes calcining and reheating devices for calcining material so as to form thereof clinkers which upon cooling in a non-oxidizing medium may be converted into white cement, and the device also serving for reheating the thus-cooled clinkers. An air-cooling device is associated with the calcining device for air cooling clinkers formed in the calcining device and for simultaneously heating of the cooling air. An arrangement is provided for introducing the thus-formed hot air as combustion air into the calcining device and, furthermore a non-oxidizing cooling device is operatively associated with the calcining device for the non-oxidizing cooling of the reheated clinkers so that the same will retain their at least substantially white color.

---

The present invention relates to a method and arrangement for producing white cement and, more particularly, the present invention is concerned with a method and arrangement for producing clinkers which may be converted, for instance, by comminution, into white cement.

Conventionally rotary kilns are used to calcine suitable raw material into portland cement clinkers for the production of gray as well as white cements.

For producing white cements, the raw material should be as free as possible of metal oxides and, according to the present invention, such raw materials are converted into clinkers which are sufficiently free of metal oxides so that white cement may be produced therefrom.

In the production of gray cement less care has to be taken with respect to the contents of metal oxides in the raw material and the clinkers as they leave the calcining kiln are cooled without special precautions, in direct heat exchange with air so that simultaneously with the cooling of the clinkers the air is heated and may then be used as combustion-supporting or combustion air in the operation of the calcining kiln.

However, when it is desired to produce white cement, it is required to use only such raw materials which have a sufficiently low content of metal oxides. Thereby clinkers are obtained which are markedly less colored than those obtained from raw materials containing a larger proportion of metal oxides but, nevertheless, the thus-obtained clinkers are still too highly colored for being directly converted into white cement and thus have to be subjected to an additional treatment. The usually applied additional treatment consists in cooling the hot clinkers emanating from the kiln under such conditions that oxidation of the same is prevented. Thus, for instance, the hot clinkers may be cooled in direct contact with water or steam, or with a controlled neutral or reducing atmosphere, in any event under the exclusion of air, in order to prevent reaction between the hot clinkers and the oxygen of the air while the temperature of the clinkers drops through the reactive range of between about 800 and 1,200° C.

The conventional processes for cooling clinkers under exclusion of oxygen prevent entirely or in part the recovery of the sensible heat of the clinkers leaving the calcining kiln, which heat—in the case of producing gray clinkers—is recovered in the form of preheated combustion air formed of the air used for cooling the hot clinkers. Thus, conventional production of white clinkers results in a considerable increase in total fuel consumption which may be up to twice the fuel consumption required for the production of gray clinkers.

This increased fuel consumption for obtaining the necessary calcining temperature may be reduced by using independent air preheaters. However, such preheaters generally do not make it possible to heat the combustion-supporting air to temperatures equally as high as those obtained when air is used for cooling the hot clinkers, but also require for their operation additional fuel. These additional fuel requirements for operation of the air preheaters offset in a large measure the savings on fuel for operation of the kiln which are achieved by thus preheating at least part of the combustion air.

It is therefore an object of the present invention to overcome the above discussed difficulties and disadvantages.

It is a further object of the present invention to provide a process for producing clinkers which may be converted into white cement, which process may be carried out with the conventional equipment for producing gray cement requiring in addition thereto only means for cooling the clinkers in a non-oxidizing medium, and nevertheless permitting heating of the combustion air for the calcining kiln.

It is a further object of the present invention to provide a method and arrangement for producing clinkers adapted to form white cement with considerably reduced fuel consumption.

It is yet another object of the present invention to provide a process and device which can make substantial use of a conventional arrangement for producing gray cement clinkers, requiring in addition thereto only a reheating means for gray or colored clinkers and the above mentioned means for cooling the reheated clinkers in the absence of oxidizing agents.

Thus it is yet another object of the present invention to provide a method or device for producing white cement clinkers which to a large extent may be carried out in a conventional kiln, taking advantage of the calcining features offered, particularly by large modern kilns, and permitting heating of combustion air by using the same for cooling the hot clinkers thereby obtaining substantial savings of fuel.

It is still a further object of the present invention to permit easy switching from the production of gray cement clinkers to white cement clinkers so that one and the same arrangement may be used for producing gray cement clinkers and may be switched to the production of white cement clinkers whenever, and to the extent that, the commercial demand so requires.

Other objects and advantages of the present invention will become apparent from a further reading of the description and of the appended claims.

With the above and other objects in view, the present invention contenplates in a method of producing white cement, the steps of calcining in a kiln in the presence of hot combustion air a material adapted to form upon calcination clinkers which when cooled in a non-oxidizing medium will be substantially white, so as to transform the material into hot clinkers, subjecting the thus formed hot clinkers to direct heat exchange with air so as to cool the clinkers and to heat the air, introducing the thus heated air as hot combustion air into the kiln, reheating the cooled clinkers to a temperature of at least between 800 and 1,200° C., and cooling the thus reheated clinkers in a non-oxidizing medium, whereby substantially white clinkers adapted to be converted into white cement are obtained, simultaneously with hot combustion air for use in the subsequent operation of the kiln.

The present invention also includes an arrangement for producing white clinkers adapted to be converted into white cement, comprising, in combination, calcining means for calcining material so as to form thereof clinkers adapted upon cooling in a non-oxidizing medium to be converted into white cement, air cooling means operatively connected to the calcining means for cooling clinkers formed in the calcining means and simultaneous heating of the cooling air so as to transform the same into hot air, introducing means for introducing the thus formed hot air into the calcining means, reheating means operatively connected to the air cooling means for reheating the thus cooled clinkers, and non-oxidizing cooling means for non-oxidizing cooling the reheated clinkers, thereby forming clinkers adapted to be converted into white cement.

Thsu, according to the method and arrangement of the present invention, clinkers for the production of white cement may be manufactured in a conventional kiln equipped with a cooler of the type which is ordinarily used in the manufacture of gray cement, so that by operation of the cooler air will be heated for use as combustion air in the calcining kiln.

It has been found that clinkers intended for the production of white cement and which have been cooled in the manner conventionally used for cooling gray clinkers and have become somewhat colored during such cooling will become white again if, after being reheated to a temperature of about 1,000° C., or between about 800 and 1,200° C., the clinkers are cooled in a non-oxidizing medium, for instance in steam or by soaking in water or by contact with a neutral or reducing atmosphere.

Thus, clinkers for white cement may be produced according to the present invention by calcining in a kiln suitable raw material, i.e., a raw material of relatively low metal oxide content, at conventional calcining temperatures so that the clinker leaving the kiln will have a temperature considerably higher than 1,200° C., generally about 1,450° C., cooling the hot clinkers in the conventional manner used in connection with gray cement clinkers, thereby heating combustion-supporting air which is then introduced into the kiln as combustion air, followed by reheating the thus obtained cooled colored clinkers to a temperature of between about 800 and 1,200° C., and cooling the thus reheated clinkers in the absence of oxidizing agents as air, as described above, preferably in water or steam or in a reducing or at least non-oxidizing neutral atmosphere.

Thus, manufacturing of white cement clinkers according to the present invention includes initial clinker formation from the raw material in a conventional kiln with the same fuel consumption as required for gray cement clinkers, followed by reheating of these clinkers, preferably in a separate heating device, which may be any one of the known types of furnaces and the like suitable for this purpose, and subsequent cooling of the thus reheated clinkers without access of oxidizing agents such as air.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic elevational view of an arrangement according to the present invention; and FIG. 2 is a schematic elevational view of another arrangement according to the present invention.

Referring now to the drawing, and particularly to FIG. 1, the clinker-forming raw materials of low metal oxide content are introduced from hopper 1 into rotating kiln 2 which kiln is of a type such as is conventionally used in the production of gray cement.

After clinker formation in kiln 2 at a temperature of about 1,450° C. the clinkers leaving kiln 2 drop into a conventional heat exchanger 3 into which cold air is introduced through blower 4. This air which is heated during passage through heat exchanger 3 in contact with the hot clinkers (thereby cooling the latter) then enters kiln 2 wherein it is used as secondary combustion air.

The clinkers leave heat exchanger 3 completely cooled, if desired down to ambient temperature and, due to the cooling in air, i.e., in an oxidizing medium, the cooled clinkers are colored.

The cooled colored clinkers are taken up by conveyor 5 and passed to hopper 6 from which the clinkers are introduced into rotating kiln 7. In kiln 7 the clinkers are heated to about 1,000° C., and then are cooled again, however, in the absence of air, i.e., in a non-oxidizing or reducing medium, in closed vessel 8, from which the cooled clinkers which are white due to the fact that the cooling was carried out in the absence of oxidizing agents, are withdrawn by means of conveyor 9.

It is also possible to introduce into hopper 6 simultaneously with the gray clinkers from conveyor 5, clinker forming raw materials.

In this case, kiln 7 must be heated to clinker forming temperature and the colored clinkers introduced by means of conveyor 5 are reheated simultaneously with clinker formation of the raw material which is introduced through hopper 6, and all of the clinkers leaving kiln 7 are then cooled in cooler 8 in the absence of an oxidizing agent.

The above described modification of the process may also be carried out with a single kiln as illustrated in FIG. 2.

The clinker forming raw material is introduced through hopper 14 into rotating kiln 15 which is of a type conventionally used for making gray cement. The hot clinkers leaving the lower end of kiln 15 drop into chamber 16 and are divided therein into two portions. One portion drops into the cooler or heat exchanger 18 and is cooled therein by contact with air, the latter being heated in heat exchange with the hot clinkers and subsequently introduced as combustion air into kiln 15. The cold air entering cooler or heater chamber 18 is introduced into the same through blower 19. The air-cooled and thus colored clinkers leaving heat exchanger 18 are reintroduced into hopper 14 by means of conveyor 21, so that the colored clinkers are recycled.

However, the second portion of the clinkers from chamber 16 is taken up by conveyor 22 and cooled in the absence of air or other oxidizing agents in an enclosure 23 from which white clinkers are withdrawn.

Thus, according to a preferred manner of carrying out the process of the present invention, as illustrated in FIG. 2, a kiln may be used simultaneously as a gray cement kiln and white cement kiln, whereby the raw material introduced into the arrangement is of sufficiently low metal oxide content to lend itself to the production of white cement clinkers.

Colored cooled clinkers formed in cooler 3 are introduced into white cement kiln 7 for reheating, whereby they may be introduced either inside the shell of the kiln or at the gate at the same time as the raw material.

The colored clinkers are then reheated simultaneously with the formation of clinkers from the newly introduced raw material and the entire load of clinkers, upon leaving the kiln is cooled by soaking in water or steam or by cooling in a reducing or neutral atmosphere.

The total fuel consumption in this case is lower than that according to conventional processes of making white cement clinkers.

According to another embodiment of the present invention, a single conventional kiln equipped with a heat exchanger is used for the production of white cement clinkers.

A part of the output of the kiln is diverted to conventional soaking or cooling devices wherein the clinkers are cooled in a neutral or reducing, i.e., non-oxidizing medium or atmosphere to give white clinkers.

The other part of the output of the kiln is passed to a conventional air cooler where, during cooling of the clinkers the cooling air is heated so as to form hot combustion air which is then introduced into the kiln, while due to the cooling in the presence of the oxygen in the air, colored clinkers are formed which are then again introduced into the kiln either at its feed inlet or into a hotter more centrally located portion of the kiln, and thus recycled.

For example, if 50% of the clinker output of the kiln are cooled in a non-oxidizing medium and 50% are cooled in contact with air, a ton of clinkers will be produced from about 1.6 tons of dry raw materials. However, due to the recycling of the portion of the clinker which was cooled in contact with air, so as to eventually produce one ton of white clinkers, the kiln must be so dimensioned as to be able to carry two tons of clinkers and/or clinker forming material in its hot portion.

At the outlet of the kiln, separation of the clinkers into two portions may be accomplished either by providing separate outlets, for instance outlets in the kiln within the calcining zone for the portion of the clinkers which are to be cooled under exclusion of oxygen, and another outlet at the lower end of the rotary kiln for the portion of the clinkers which will serve to heat the combustion air. However, it is also possible to separate the clinkers produced in the kiln at the output end thereof by means of any known devices such as tilting tractors, tractors for separating the stream of clinkers, turntables, etc.

It is also possible, in accordance with the present invention to store the cooled colored clinkers for any desired period of time prior to reheating the same to at least about between 800 and 1,200° C., followed by cooling in the absence of oxidizing agents.

It should be noted that the process of the present invention can be carried out with kilns converting wet raw materials as well as with kilns for conversion of dry raw materials.

Usually, the different constituents of cement, primarily calcium carbonate and aluminum silicate, are prepared separately and mixed prior to being introduced into the kiln.

However, it is very difficult to obtain a homogeneous mixture of these pulverulent materials and, for this reason, until recently, water was added to these pulverulent materials and a pasty mixture was formed by stirring. This additionally introduced water must be evaporated and removed during the calcining or burning of the materials to form clinkers thereof. The evaporation and removal of the added water considerably increases the heat and fuel consumption during the calcining process.

In the last few years, a method has been developed which permits forming of an intimate homogeneous pulverulent mixture of the cement-forming raw materials by application of compressed air. This relatively new method makes it possible to introduce into the kiln dry raw materials and thus to save the amount of heat and fuel which previously was necessary to evaporate the added water of the wet process.

The present invention applies to the dry as well as to the wet process described above, in other words, the present invention may be carried out with a mixture of dry raw materials, as well as a pasty mixture of water-containing raw materials.

Particularly, the use of a reheater for the air cooled colored clinkers in which the clinkers are heated for instance from 20° C. to 1,000° C. prior to being cooled in the absence of oxidizing agents, will result in significant heat and fuel savings.

The following examples are given as illustrative only without, however, limiting the invention to the specific details of the examples.

The process of the present invention may be carried out by forming clinkers in a first kiln, air cooling the clinkers, reheating the same in a second kiln and then again cooling the clinkers in a non-oxidizing medium.

It is known that the above described wet process without utilizing the sensible heat of the clinkers for preheating combustion air requires about 2,800,000 kcal. per ton of clinkers.

The pasty raw materials forming white cement is converted into clinkers in a rotating klin of the type "Miag" which is equipped with a predrier of the type "Calcinator."

The kiln has an average diameter of 2.5 meters and a length of 56.35 meters, it is inclined at 3.5% relative to its length and it revolves at 1 r.p.m.

The diameter of the Calcinator is 3.50 meters and its length is 2.10 meters. The heat exchanger or clinker cooler is of the type known as "Fuller."

The entire process requires 48 hours at a clinker production rate of 170 tons per day.

The heat consumption amounts to 1,500,000 kcal. per ton of clinkers, in other words, the amount of heat consumed is the same as that for burning of gray clinkers in the same kiln.

The thus produced colored clinkers are recovered at the outlet of the Fuller cooler on a moving belt which conveys the same to the charging hopper of a second kiln.

The second kiln in which the colored clinkers are reheated from ambient temperature to about 1,000° C. may be the same type of kiln as that used for forming the clinkers as described above.

The diameter of the second kiln, for instance may be between 2.12 and 2.55 meters and its length 60.6 meters. The second kiln may rotate at a speed of 1 r.p.m. and it preferably will be inclined at about 3.5%.

Since the second kiln as described above is not specifically constructed for the simple reheating of dry products, its heat economy is poor since the heating gases are withdrawn at a temperature of 600° C. and consequently will contain considerable unused caloric energy.

Better heat economy can be achieved by using for the reheating of the dry colored clinkers a conventional heating device specifically intended for this purpose.

The colored clinkers upon being reheated to 1,000° C. and then immersed in water, i.e., cooled in a non-oxidizing medium, will be as white as clinkers produced by direct immersion in water upon leaving the first clinker-forming kiln at a temperature of about 1,450° C.

The above described reheating, due to the fact that a conventional wet process kiln was used, requires between about 1,000,000 and 1,200,00 kcal. per ton. Theoretically, 240,000 kcal. would suffice for heating a ton of clinkers from 20 to 1,000° C. Thus, it can be concluded that by utilizing a second kiln or heating device which is specifically designed for the heating of dry clinkers to about 1,000° C., and assuming an average thermal yield of 50%, the reheating of the dry colored clinkers to 1,000° C. will not require more than 500,000 kcal. per ton so that the total heat consumption of burning the raw material and reheating the colored clinkers will be about 2,000,000 kcal. per ton, resulting in a saving of 800,000 kcal. per ton as compared with the conventional process of producing white cement clinkers.

By carrying out the process of the present invention in connection with the recent dry process of clinker formation, the entire heat requirements will be 800,000 kcal. per ton required for clinker formation from a dry raw material mixture plus 500,000 kcal. per ton for reheating, or a total of 1,300,000 kcal. per ton.

Actually, the thermal requirements of the kiln for reheating the clinkers will be less than 500,000 kcal. if the clinkers were formed of a mixture of dry materials, since the combustion air requirements of the first kiln when operating under the dry process are less than the amount of hot combustion air produced in the first kiln of the freshly formed hot clinkers. The surplus of hot air is then available for supplementing the combustion air in the reheating kiln, thus reducing the amount of additional heat energy which must be supplied to the reheating kiln.

Thus, the present process when carried out in connection with the method of producing clinkers from a dry mixture of raw materials will involve a total heat consumption of 800,000 kcal. in the first or clinker forming kiln and 400,000 kcal. in the second or reheating kiln, or a combined total of 1,200,000 kcal.

It will be understood that each of the elements described above, or two or more together, may also find a useful application in other types of white cement clinker forming devices differing from the types described above.

While the invention has been illustrated and described as embodied in a kiln arrangement for forming white cement clinkers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended.

What is claimed as new and desired to be secured by Letters Patent is:

1. In a method of producing white hydraulic cement, the steps of calcining in a kiln in the presence of hot combustion air a material capable of forming upon calcination clinkers which when cooled in a non-oxidizing medium will be substantially white, so as to transform said material into hot clinkers; subjecting the thus formed hot clinkers to direct heat exchange with air so as to cool said clinkers, to heat said air and to obtain colored clinkers; introducing the thus heated air as hot combustion air into said kiln; reheating the thus obtained colored, cooled clinkers to a temperature of at least between 800 and 1,200° C. so as to cause the coloration of said clinkers to substantially disappear; and cooling the thus reheated clinkers in a non-oxidizing medium, whereby substantially white clinkers capable of being converted into white cement are obtained, simultaneously with heated air capable of being used in the subsequent operation of said kiln.

2. A method as defined in claim 1, wherein said clinkers formed upon calcining of said material, prior to subjecting the same to direct heat exchange with air, have a temperature of about 1,450° C.

3. A method as defined in claim 1, wherein said clinkers are cooled in direct heat exchange with air to a temperature below 800° C.

4. A method as defined in claim 1, wherein said cooled clinkers are reheated to a temperature between 800 and 1,200° C.

5. A method as defined in claim 1, wherein said non-oxidizing medium is $H_2O$.

6. A method as defined in claim 1, wherein said reheated clinkers are cooled to substantially ambient temperature.

7. In an arrangement for producing white clinkers capable of being converted into white cement, in combination, calcining and reheating means for calcining material so as to form thereof clinkers capable upon cooling in a non-oxidizing medium to be converted into white cement, and for reheating thus-cooled clinkers; air-cooling means operatively connected to said calcining means for air cooling clinkers formed in said calcining means and for simultaneously heating of the cooling air so as to transform the latter into hot air; introducing means for introducing the thus formed hot air into said calcining means; and non-oxidizing cooling means operatively connected to said calcining means for non-oxidizing cooling of said reheated clinkers.

8. An arrangement as defined in claim 7, and including means for separating clinkers formed in said calcining and heating means into two portions and for directly introducing one of said portions into said non-oxidizing cooling means, and the other of said portions into said air cooling means.

9. An arrangement as defined in claim 7, and including means for simultaneously introducing portions of said material and of said air cooled clinkers into said calcining and reheating means.

References Cited

UNITED STATES PATENTS 3,003,757   10/1961   Mitchell ---------- 263—32 X

FOREIGN PATENTS 814,836   6/1959   Great Britain.

JOHN J. CAMBY, *Primary Examiner.*

U.S. Cl. X.R.

263—53